(12) United States Patent
Bork

(10) Patent No.: US 8,950,619 B2
(45) Date of Patent: Feb. 10, 2015

(54) METALLIC END CLOSURE WITH TEAR PANEL HAVING IMPROVED RIGIDITY

(71) Applicant: Ball Corporation, Broomfield, CO (US)

(72) Inventor: Daniel Benjamin Bork, Superior, CO (US)

(73) Assignee: Ball Corporation, Broomfield, CO (US)

( * ) Notice: Subject to any disclaimer, the term of this patent is extended or adjusted under 35 U.S.C. 154(b) by 0 days.

(21) Appl. No.: 13/887,977

(22) Filed: May 6, 2013

(65) Prior Publication Data

US 2013/0292382 A1   Nov. 7, 2013

Related U.S. Application Data

(60) Provisional application No. 61/642,609, filed on May 4, 2012.

(51) Int. Cl.
| | |
|---|---|
| *B65D 17/34* | (2006.01) |
| *B65D 17/00* | (2006.01) |
| *B65D 17/347* | (2006.01) |
| *B64D 11/06* | (2006.01) |

(52) U.S. Cl.
CPC ............ *B65D 17/163* (2013.01); *B65D 17/165* (2013.01); *B64D 2011/062* (2013.01)
USPC .......................................... 220/269; 220/270

(58) Field of Classification Search
USPC .......................................... 220/269, 270, 271
See application file for complete search history.

(56) References Cited

U.S. PATENT DOCUMENTS

| | | | |
|---|---|---|---|
| 4,062,471 A | 12/1977 | Perry | |
| 4,084,721 A | 4/1978 | Perry | |
| 4,276,993 A | 7/1981 | Hasegawa | |
| 4,361,251 A | 11/1982 | Langseder et al. | |
| 4,465,204 A | 8/1984 | Kaminski et al. | |
| RE31,702 E | 10/1984 | Brown | |
| 5,064,087 A | 11/1991 | Koch | |
| 5,129,541 A | 7/1992 | Voigt et al. | |
| 5,219,257 A | 6/1993 | Koch | |
| 5,307,947 A | 5/1994 | Moen et al. | |
| D365,988 S | 1/1996 | Clarke, III | |
| 5,555,992 A | 9/1996 | Sedgeley | |
| 5,653,355 A | 8/1997 | Tominaga et al. | |
| 5,692,636 A * | 12/1997 | Schubert | 220/271 |
| 5,711,448 A | 1/1998 | Clarke, III | |
| 5,738,237 A | 4/1998 | McEldowney | |
| 5,851,685 A | 12/1998 | McEldowney | |
| 5,875,911 A | 3/1999 | McEldowney | |
| 6,024,239 A | 2/2000 | Turner et al. | |
| 6,050,440 A | 4/2000 | McEldowney | |

(Continued)

FOREIGN PATENT DOCUMENTS

WO   WO 2011/053776   5/2011

OTHER PUBLICATIONS

International Search Report and Written Opinion for International (PCT) Patent Application No. PCT/US2013/039700, mailed Aug. 29, 2013, 9 pages.

*Primary Examiner* — Mickey Yu
*Assistant Examiner* — Niki Eloshway
(74) *Attorney, Agent, or Firm* — Sheridan Ross P.C.

(57) ABSTRACT

An end closure for a container is provided. The end closure includes a stay-on-tab and a tear panel defined by a frangible score and a non-frangible hinge segment. The tear panel includes a raised portion which extends in an upward orientation toward a public side of the end closure.

20 Claims, 5 Drawing Sheets

(56) References Cited

U.S. PATENT DOCUMENTS

| | | |
|---|---|---|
| 6,161,717 A | 12/2000 | Forrest et al. |
| 6,405,889 B1 | 6/2002 | Neiner |
| 7,000,797 B2 | 2/2006 | Forrest et al. |
| 7,165,696 B2 | 1/2007 | Neiner |
| 7,165,926 B2 * | 1/2007 | Rieck et al. ............ 413/12 |
| 2001/0002671 A1 * | 6/2001 | Heinicke et al. ........ 220/269 |
| 2004/0056032 A1 | 3/2004 | Vaughan |
| 2007/0062950 A1 * | 3/2007 | Rieck et al. ............ 220/269 |
| 2007/0108208 A1 * | 5/2007 | Dickie .................... 220/269 |
| 2009/0039091 A1 | 2/2009 | Forrest et al. |
| 2010/0258562 A1 * | 10/2010 | Linden et al. ........... 220/269 |
| 2010/0326281 A1 * | 12/2010 | Nishibe et al. ........... 99/275 |
| 2012/0228296 A1 * | 9/2012 | Fields ..................... 220/269 |
| 2013/0037543 A1 * | 2/2013 | McClung et al. ....... 220/269 |

* cited by examiner

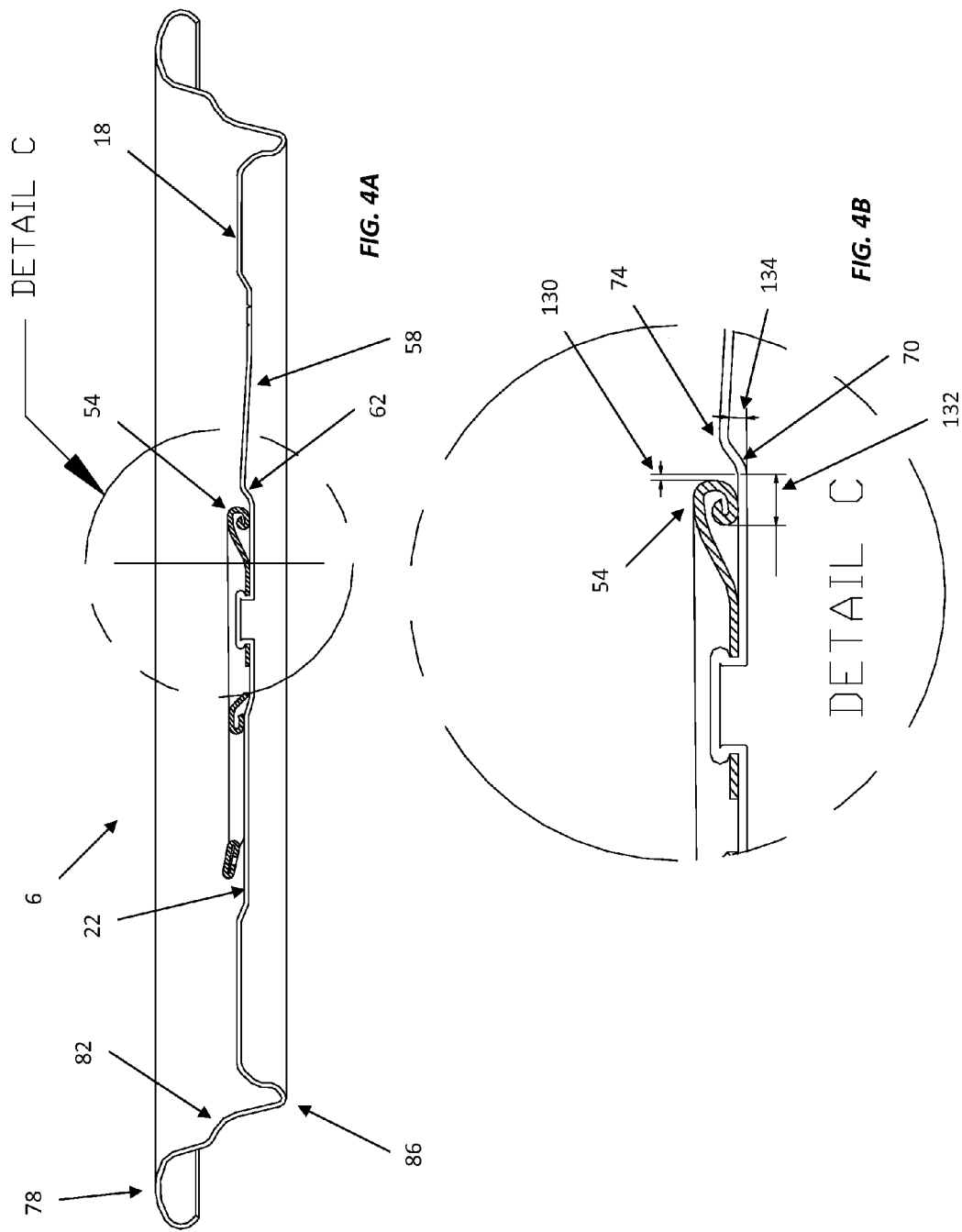

METALLIC END CLOSURE WITH TEAR PANEL HAVING IMPROVED RIGIDITY

RELATED APPLICATIONS

This Non-Provisional Application claims the benefit of priority from U.S. Provisional Patent Application No. 61/642,609 filed May 4, 2012, the entire disclosure of which is hereby incorporated by reference in its entirety.

FIELD

The present invention relates generally to an end closure adapted for interconnection to a beverage container and, more particularly, to a metallic end closure with a tear panel having improved rigidity.

BACKGROUND

The configuration of a container end closure affects the level to which end consumers, as well as bottlers, manufacturers, distributors, shippers, and retailers, are satisfied with a beverage container. One factor is the opening characteristics of the container, including the ease and reliability of opening the container. Many beverage containers currently are provided with easy-open end closures, commonly referred to as "stay-on-tab" or "SOT" end closures, in which a pull tab is interconnected to a central panel by a rivet. In these container end closures, the central panel includes a tear panel defined by a curvilinear score line and a hinge line formed between the end points of the score line. Generally, pulling upward on a lift end of the tab pivots the tab about the rivet and presses the nose of the tab downward on the tear panel. Sufficient downward force exerted on the tear panel by the nose of the tab causes the score line to fracture, thus permitting the tear panel to bend or pivot inward about the hinge line. The downward displacement of the tear panel creates an opening for dispensing the contents of the container. Both the tear panel and the pull tab remain attached to the end closure after opening, thus reducing pollution and the possibility of a user ingesting the tab.

To facilitate the opening of the tear panel, some stay-on-tab end closures currently utilize features formed in the tear panel to stiffen the tear panel and/or gather slack metal created during formation of the score line. For example, some existing stay-on-tab end closures include a raised u-shaped bead projecting upward from the public side of the tear panel or a recessed u-shaped bead projecting downward from the product side of the tear panel. When these end closures are seamed and sealed to a container filled with a carbonated beverage, the tear panels tend to exhibit doming despite the presence of the bead. Examples of these conventional stay-on-tab end closures are provided in U.S. Patent Publication No. 2007/0108208 and U.S. Pat. Nos. 5,219,257; 6,161,717; 6,405,889; 7,000,797; and 7,165,696, the entire disclosures of which are hereby incorporated herein by reference.

Further, some existing stay-on-tab end closures include a tear panel having a depressed region. The depressed region does not sufficiently stiffen the tear panel and does not adequately remove slack metal displaced during score formation. An example of this type of stay-on-tab end closure is provided in U.S. Pat. No. 5,875,911, the entire disclosure of which is hereby incorporated herein by reference.

Thus, there is a need to provide a container end closure that provides enhanced opening characteristics over existing stay-on-tab end closures. For example, there is a need in the industry for a stay-on-tab end closure that has a stiffened tear panel. In addition, there is a need for a stay-on-tab end closure with reduced doming of the tear panel when the container is subject to increased internal pressure, such as when the container is filled with a carbonated beverage. Doming of the end panel, and especially doming of the tear panel, results in increased fracture resistance of the tear panel, which reduces the effectiveness of the stay-on-tab end closure and increases the likelihood of premature fracturing and leakage during storage or transportation.

SUMMARY

Generally, embodiments of the present invention provide a stiffened tear panel with reduced susceptibility to doming of the opening tear panel, thereby improving opening characteristics. Embodiments of the present invention further provide for a stiffened tear panel that reduces the risk of premature burst or rupture of the panel and score.

One improvement provided by embodiments of the present invention is a reduction in the force required to fracture and displace the tear panel. Because the tear panel exhibits little or no doming, and because of an upward orientation of a stiffening feature formed in the tear panel, embodiments of the provided end closure reduce tab failure and improve opening characteristics.

During the manufacturing of metallic beverage end closures, multiple forming operations occur to produce a final product. The forming process generally can be segregated into distinct processes, including shell formation and shell conversion. Shell formation includes the creation of a predominately round blank from thin metal, such as aluminum, and the formation in one or more high speed presses of an initial geometry that typically includes a countersink, chuck wall, peripheral curl, and central panel. The subsequent shell conversion process includes the creation of a finished end which is adapted for interconnection to a neck of a metallic beverage container. The shell conversion process includes, but is not limited to, processes which form a bubble, rivet, coin, score, panel deboss, panel profile features, incisions, tab progression, and staking the tab to the end closure.

During the shell conversion process, the central panel is scored to define a tear panel, also commonly referred to as an opening or pour panel. The formation of the score, which is generally v-shaped in cross-section, displaces base material radially inward and radially outward from the score, creating what is known as slack metal. The presence of slack metal on retained metal beverage end closures domes the central panel region and produces unpredictable opening characteristics and tab failure.

Embodiments of the present invention address the radially outward displacement of slack metal by providing a central panel with a panel deboss, which is common on existing end closures. Embodiments of the present invention address the radially inward displacement of slack metal by gathering the slack metal into an upward feature formed in the tear panel, thereby stiffening the tear panel to provide improved opening characteristics and reduced doming. The upward feature has an upward configuration toward the public side of the end closure.

Thus, in accordance with one aspect of the present invention, a container end closure is provided having a stiffened tear panel for superior and predictable opening characteristics and inherent improvements in performance. In one embodiment, an end closure is provided with a retained-tab and a displaceable tear panel defined by a frangible score and a non-frangible hinge segment. The tear panel includes a raised portion which extends in an upward orientation toward the public side of the end closure, rather than a downward orientation toward a product side of the end closure. The raised portion of this embodiment reduces slack metal by gathering excess material pushed radially inward by a scoring operation, increases the stiffness of the tear panel, and generally improves the opening characteristics of the end closure. The raised portion may be formed in various shapes. For example, the raised portion may be triangular, square, bulbous, circular, curved, and other shapes known in the art. Further, the raised portion may be symmetrical or non-symmetrical about an axis that bisects the tear panel. Under internal pressure, the upward orientation of the raised portion decreases compressive forces and increases tensile forces within the tear panel region as compared to existing end closures, thereby decreasing the likelihood of failure by mode of buckling.

In accordance with another aspect of the present invention, a method of forming a container end closure having a stiffened tear panel is provided. In an embodiment, a process of manufacturing an end closure with improved opening characteristics includes: creating a predominately round blank from thin metal, such as aluminum; forming an initial cross-sectional shape including, but not limited to, a countersink, a chuck wall, a peripheral curl, and a central panel; forming various features within, or adapted for use with, the end closure including, but not limited to, a panel deboss, a coin, a score line, and a tab; and forming an upward feature within the tear panel, wherein forming the upward feature stiffens the tear panel and draws in slack metal created during formation of the score line.

Generally, the container and associated end closure discussed herein are formed of conventional metallic materials, such as aluminum. However, a container end closure according to certain embodiments of the present invention can be formed of other materials, including other metals or metal alloys, plastics, cardboard, paper, fiber reinforced materials, and the like.

During scoring operations, an opening panel is formed within a score line and the formation of the score displaces base material inwardly and outwardly to create what is known as slack metal. The presence of slack metal on end closures produces unpredictable opening characteristics and may cause tab failure(s). Slack metal generally domes the panel region. The outward displacement of the metal from the score is addressed by the main panel deboss. The slack metal is displaced inwardly by the scoring operation and domes the opening panel in an upward orientation, conventionally known as toward the public side. Methods and devices of the present invention gather domed slack metal into an upward feature or bead, thereby stiffening the opening panel to provide desirable opening characteristics.

For purposes of clarity and consistency, some of the terms used in the specification and the claims hereof will now be defined. Directional terms such as "up," "down," "high,", "low," "upper," "lower," "top," "bottom," "side," "horizontal," and "vertical" refer to end closures as though they were disposed in operational relationship with an upright, level container body resting on a flat horizontal surface. Directional terms such as "in" and "inward" relate to the interior of a container formed with an end closure, whereas directional terms such as "out" and "outward" relate to the exterior of a container formed with an end closure.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The Summary is neither intended nor should it be construed as being representative of the full extent and scope of the present disclosure. Moreover, references made herein to "the present invention" or aspects thereof should be understood to mean certain embodiments and should not necessarily be construed as limiting all embodiments to a particular description. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosure and together with the general description given above and the detailed description of the drawings given below, serve to explain the principles of these embodiments. In certain instances, details that are not necessary for an understanding of the disclosure or that render other details difficult to perceive may have been omitted. It should be understood, of course, that the claimed subject matter is not necessarily limited to the particular embodiments illustrated herein. Additionally, it should be understood that the drawings are not necessarily to scale.

FIG. 4A is a cross-sectional elevation view of an end closure according to an embodiment of the present invention;

FIG. 4B is a detailed cross-sectional elevation view of an end closure being formed according to an embodiment of the present invention;

Figure 1:
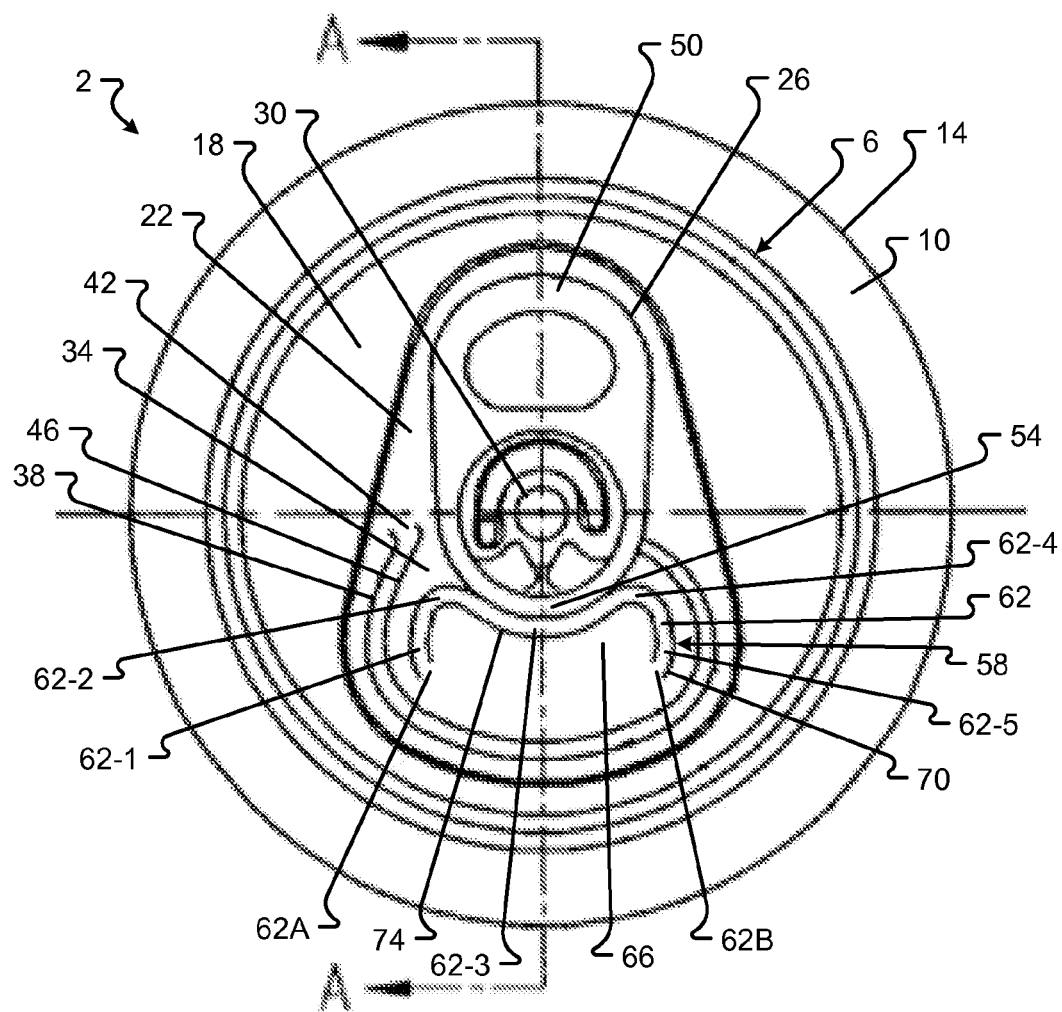
FIG. 1 is a top plan view of a container according to an embodiment of the present invention.

To assist in the understanding of the drawings, the following is a list of components and associated numbering found in the drawings:

Components
2 Container
6 End closure
10 Neck
14 Container sidewall
18 Central panel
22 Panel deboss
26 Pull tab
30 Rivet
34 Tear panel
38 Frangible score
42 Non-frangible hinge segment
46 Anti-fracture score
50 Lift end (of pull tab)
54 Nose (of pull tab)
58 Raised portion (of tear panel)
62 Sidewall (of raised portion)
62A First endpoint (of sidewall)
62B Second endpoint (of sidewall)
62-1 First segment (of sidewall)
62-2 Second segment (of sidewall)
62-3 Third segment (of sidewall)
62-4 Fourth segment (of sidewall)
62-5 Fifth segment (of sidewall)
66 Ramp (of raised portion)
70 Outer periphery (of raised portion)
74 Transition (of raised portion)
78 Peripheral curl
Components
82 Chuck wall
86 Countersink
90 Public side
94 Product side
98 Lower tooling member
102 Upper tooling member
106 Relief portion
110 Anvil
114 Anvil edge
118 Upper tooling member edge
122 Relief portion
126 Lower surface
130 Nose offset
132 Inner nose offset
134 Ramp angle

DETAILED DESCRIPTION

Before any embodiments of the invention are described in detail, it is to be understood that the claimed subject matter is not limited in its application to the details of construction and the arrangement of components set forth in the following description or illustrated in the following drawings. The claimed subject matter is capable of other embodiments and of being practiced or of being carried out in various ways. Also, it is to be understood that the phraseology and terminology used herein is for the purpose of description and should not be regarded as limiting.

Referring to FIG. 1, a top plan view of an end closure 2 according to an embodiment of the present invention is shown. As depicted, the container 2 includes an end closure 6 interconnected to a neck 10 of a container sidewall 14. Manners of forming container bodies and of attaching or coupling an end closure to a container body to form the depicted device are well known in the art.

The end closure 6 includes a central panel 18 having a recessed area commonly referred to as a panel deboss 22. Within the panel deboss 22, a pull tab 26 is coupled to the end closure 6 by a rivet 30, and a tear panel 34 is defined by a frangible score 38 and a non-frangible hinge segment 42. In the depicted embodiment, a second inward "anti-fracture" score 46 is positioned substantially parallel with the frangible score 38. The anti-fracture score 46 has been found useful in protecting the frangible score 38; however, no rupture occurs along the anti-fracture score 46 in normal operation. Generally, pulling upward on a lift end 50 of the pull tab 26 results in the nose 54 of the pull tab 26 pressing downward on part of the tear panel 34 with sufficient force to cause a rupture to form along the frangible score 38, permitting the tear panel 34 to bend or pivot inward about the non-frangible hinge segment 42 defined between the end points of the frangible score 38. The score is generally v-shaped in cross-section. For example, the score profile may be a standard 206 or 202 end closure score. Once the tear panel 34 has been pivoted inward, the contents of the container 2 can be dispensed through the end closure 6 opening.

Still referring to the embodiment depicted in FIG. 1, the tear panel 34 includes a raised portion 58 having a sidewall 62 and a ramp 66. The sidewall 62 extends upward from an outer periphery 70 to a transition 74. The outer periphery 70 generally defines the transition between a non-raised portion of the tear panel 34 and the sidewall 62. In some embodiments, a non-raised portion of the tear panel is substantially planar with the panel deboss 22, which may be disposed within a substantially horizontal plane. The transition 74 generally defines the transition between the sidewall 62 and the ramp 66. As depicted, the curvilinear outer periphery 70 and the curvilinear transition 74 are substantially parallel. To maintain the parallel relationship, the profile of the sidewall 62, which may be linear or curved, varies to accommodate changes in the height of the transition 74 as the sidewall 62 travels along an arcuate path from a first endpoint 62A to a second endpoint 62B. In an alternative embodiment, the outer periphery 70 and the transition 74 are not substantially parallel. Rather, the profile of the sidewall 62 is kept constant from near the first endpoint 62A of a first segment 62-1 to near the second endpoint 62B of a fifth segment 62-5. Thus, in this alternative embodiment, the transverse distance between the transition 74 and the outer periphery 70 varies as the sidewall 62 travels along the arcuate path from a first endpoint 62A to a second endpoint 62B. In one embodiment, the profile of the sidewall 62 fades out into the tear panel 34 on either end 62A, 62B.

In the depicted embodiment, the sidewall 62 has five segments. The first segment 62-1 and the fifth segment 62-5 are substantially parallel with the frangible score 38 to evenly draw slack metal displaced inwardly during formation of the score line and to provide uniform stiffness to the tear panel, thereby enhancing rupture of the frangible score 38 and reducing opening failures, including pull tab 26 failure. The third segment 62-3 follows the contour of the nose 54 of pull tab 26 to evenly distribute the downward forces exerted by the pull tab 26 across the tear panel 34 to further improve opening characteristics of the end closure 6. As illustrated, the third segment 62-3 can be positioned radially outward of the nose 54 of the pull tab 26. However, in an alternative embodiment, the third segment 62-3 can be at least partially positioned beneath the nose 54 of the pull tab 26 such that the nose 54 contacts the third segment 62-3 during opening of the end closure 6. The second segment 62-2 and the fourth segment 62-4 are transitioning segments between the third segment 62-3 and the first and fifth segments, respectively.

In the embodiment depicted in FIG. 1, the ramp 66 extends upward from a non-raised portion of the tear panel 34 to the transition 74. Generally, the ramp 66 extends upward from a substantially straight line defined between the endpoints 62A, 62B of the sidewall 62 to the transition 74. The non-raised portion generally includes portions of the tear panel not included in the raised portion. As depicted in FIG. 1, the endpoints 62A, 62B of the sidewall 62 are spaced apart by a predefined distance.

The raised portion 58 may vary in size. For example, the endpoints 62A, 62B of the sidewall may be positioned further along the frangible score 38, thereby increasing the area of the ramp 66. As another example, the distance between the first segment 62-1 and the fifth segment 62-5 of the sidewall 62 may be altered. In addition, the height of the raised portion 58 relative to the non-raised portion of the tear panel 34 can be altered to improve stackability of the end closures 6. Generally, the raised portion 58 gathers slack metal displaced inwardly during the formation of the frangible score 38, and the optional anti-fracture score 46, to improve the opening characteristics of the end closure 6. As depicted, the raised portion 58 is symmetrical about line A-A in FIG. 1; however, in alternate embodiments, non-symmetrical configurations may be utilized.

Figure 2:
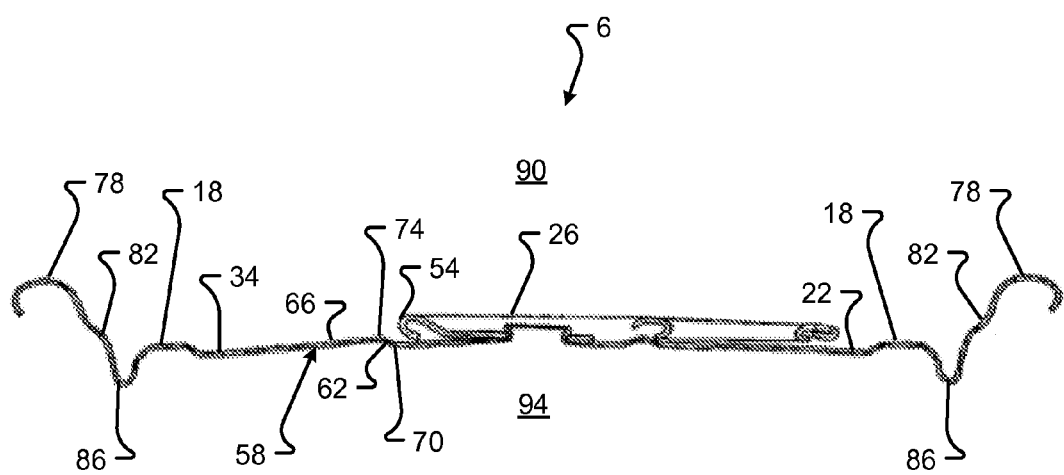
FIG. 2 is a cross-sectional elevation view of the end closure depicted in FIG. 1 taken along line A-A.

Referring now to FIG. 2, a cross-sectional elevation view of the end closure 6 taken along line A-A of FIG. 1 is provided. As depicted, the end closure 6 is not interconnected to a neck of a container by double seaming or other methods known in the art of can making. The depicted end closure 6 includes a peripheral curl 78, a chuck wall 82 interconnected to a lower end of the peripheral curl 78 and extending downwardly from the peripheral curl 78, a countersink 86 interconnected to a lower end of the chuck wall 82, and a central panel 18 interconnected to the countersink 86. The central panel 18 includes a panel deboss 22 which, in some embodiments, is substantially planar with a non-raised portion of the tear panel 34. The tear panel 34 includes a raised portion 58 that extends in an outward orientation toward a public side 90 of the end closure 6. In the embodiment depicted in FIG. 2, the raised portion 58 extends upwardly toward the nose 54 of the pull tab 26. The raised portion 58 includes a transition 74 defining the transition between a sidewall 62 and a ramp 66. The transition 74 can be a sharp or rounded transition.

The profile of the sidewall 62 may be linear, arcuate, or combinations thereof. As depicted in FIG. 2, the sidewall 62 has a linear profile extending upward from an outer periphery 70 to the transition 74. Alternatively, the sidewall 62 can have an arcuate profile with a concave shape, convex shape, or combinations thereof. The slope for a linear profile or the radius of curvature for an arcuate profile can vary for a given embodiment.

The profile of the ramp 66 may be linear, arcuate, or combinations thereof. As depicted in FIG. 2, the ramp 66 has a linear profile extending upward from a non-raised portion of the tear panel 34 to the transition 74. Alternatively, the ramp 66 can have an arcuate profile with a concave shape, convex shape, or combinations thereof. The slope for a linear profile or the radius of curvature for an arcuate profile can vary for a given embodiment.

Generally, the sidewall 62 and the ramp 66 have differing profiles and/or slopes. For example, as depicted in FIG. 2, the sidewall 62 has a linear profile with a greater slope than the linear profile of the ramp 66. If the sidewall 62 and ramp 66 have arcuate profiles, the sidewall 62 and ramp 66 may have a different radius of curvature. For example, the sidewall 62 may have a smaller radius of curvature than the ramp 66. Further, the sidewall 62 and ramp 66 may have arcuate profiles with different orientations. For example, the sidewall 62 may have a convex profile whereas the ramp 66 may have a concave profile, or vice versa. Moreover, the sidewall 62 may have a linear profile whereas the ramp 66 has an arcuate profile, or vice versa.

In the depicted embodiment, the portion of the transition 74 positioned proximate to the nose 54 of the pull tab 26 is the uppermost feature of the raised portion 58. The uppermost feature may include, but is not limited to, the second segment 62-2, the third segment 62-3, the fourth segment 62-4, or any combinations thereof. In various embodiments, an uppermost point on the transition 74 extends above a non-raised portion of the tear panel 34 from about 0.001 inches to about 0.020 inches, and preferably from about 0.011 inches to about 0.015 inches. This height range provides a raised portion 58 that can draw slack metal from the tear panel 34 to improve the opening characteristics of the end closure 6, while minimizing thinning in the cross-section of the raised portion 58. Additionally, this height range of the raised portion 58 does not impact stackability of the end closures 6 during manufacture, transportation, or assembly.

Figure 3:
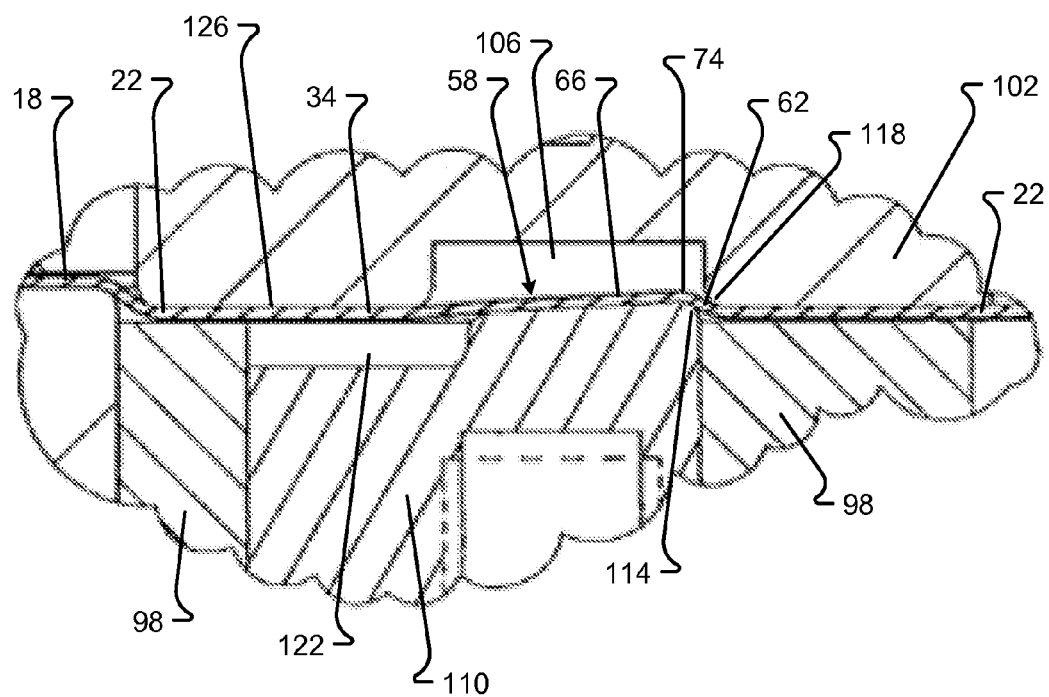
FIG. 3 is a cross-sectional elevation view of an end closure being formed according to an embodiment of the present invention.

Referring now to FIG. 3, a cross-sectional elevation view of an end closure being formed according to an embodiment of the present invention is provided. The tooling includes a lower tooling member 98 and an upper tooling member 102. The upper tooling member 102 includes a relief portion 106 that corresponds with an anvil-like portion 110 disposed in the lower tooling member 98. The anvil 110 has an angled upper surface corresponding with the desired profile of the ramp 66. Upon moving the tooling from a spaced-apart position to a closed metal forming position, the panel deboss 22 is held between the lower tooling member 98 and the upper tooling member 102. The anvil 110 presses upon the lower surface of the tear panel 34 and forms a raised portion 58 having a sidewall 62 and a ramp 66. An edge 114 of the anvil 110 and an edge 118 of the upper tooling member 102 forms the profile of the sidewall 62. The anvil 110 is preferably formed from a removable insert that allows for both replacement due to wear and adjustment through selective elevation thereof as is well known in the art.

Preferably, there is very little thinning of the metal during formation of the raised portion 58, and the raised portion 58 is instead created by forming or drawing the metal between two opposed dies to take up slack metal. The anvil 110 includes a relief portion 122 that allows slack metal to be drawn into the raised portion 58. The upper tooling member 102 maintains contact with the panel deboss 22 and the tear panel 34 during formation of the raised portion 58 to maintain the proper profile of the end closure 6. The formation of the raised portion 58 thereby draws available loose metal in the region, such as slack metal caused by a scoring operation. The raised portion 58 also stiffens the tear panel 34 to decrease panel deflection during opening of the tear panel 34 by the pull tab 26.

FIG. 4A is a cross-sectional elevation of one embodiment of the present invention as shown and described herein. FIG. 4B is a detailed view of the detail feature called out as DETAIL C in FIG. 4A. As shown, a nose portion 54 is provided proximal a transition 74, the transition 74 comprising a ridgeline or maximum height of an upwardly extending ramp 58 of a tear panel. A sidewall 62 extends downwardly between the transition 74 and an outer periphery 70 of the raised portion. An end of the nose portion 54 is offset from the outer periphery 70 by an offset 130. In various embodiments, the offset 130 is between approximately 0.005 inches and approximately 0.025 inches. In certain embodiments, the offset 130 is between approximately 0.010 inches and approximately 0.020 inches. In preferred embodiments, the offset 130 is between approximately 0.010 inches and approximately 0.0125 inches. An inner portion of the nose 54 is offset from the outer periphery 70 by a second offset 132, the second offset being between about 0.075 inches and 1.00 inches, and preferably being about 0.08 inches. An angle 134 of the ramp portion 58 with respect to horizontal is depicted. This ramp angle 134 is between approximately 1 degree and approximately 5 degrees in various embodiments. In certain embodiments, the ramp angle 134 comprises an angle between approximately 2 and 4 degrees. In one embodiment, the ramp angle 134 is contemplated as being approximately 3.0 degrees.

Figure 5A:
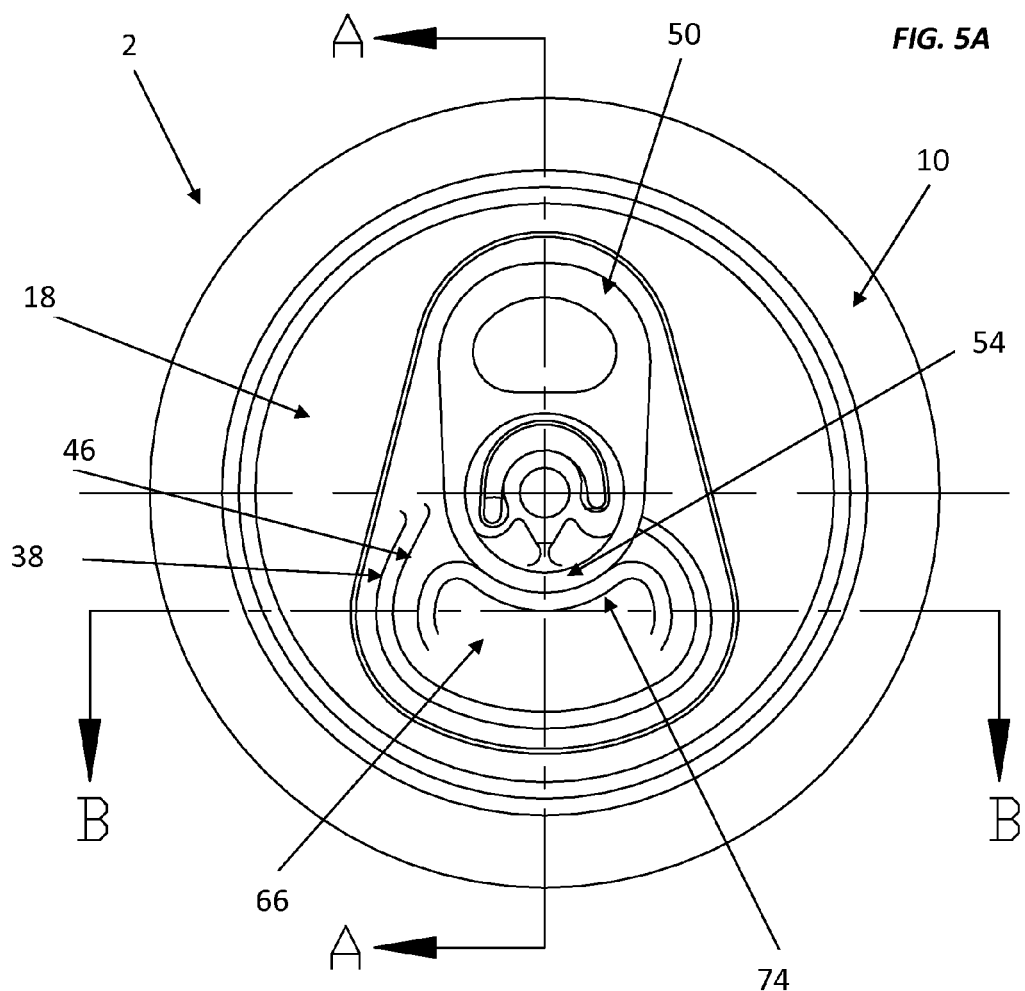
FIG. 5A is a top plan view of a container according to an embodiment of the present invention.
Figure 5B:
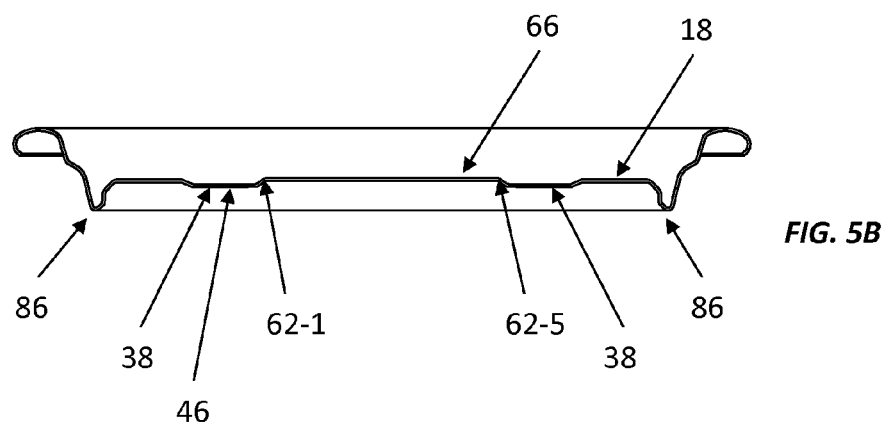
FIG. 5b is a cross-sectional elevation view of the end closure depicted in FIG. 5 taken along line B-B.

FIG. 5A is a top plan view of an end closure according to one embodiment. FIG. 5B is a corresponding cross-sectional view taken along line B-B of FIG. 5A. Line A-A of FIG. 5A is depicted at FIG. 2. Various features of an end closure of the present invention, as shown and described herein, are depicted in relation to one another.

The foregoing disclosure has been presented for purposes of illustration and description, and is not intended to be exhaustive or limiting. References made herein to "the present invention" or aspects thereof should be understood to mean certain embodiments of the present invention and should not necessarily be construed as limiting all embodiments to a particular description. The scope of the claimed subject matter is limited only by the scope of the following claims. While various embodiments have been described in detail, it is apparent that modifications and alterations of those embodiments will occur to those skilled in the art. It is to be expressly understood that such modifications and alterations are within the scope and spirit of the claimed subject matter, as set forth in the following claims.

What is claimed is:

1. A metallic end closure adapted for interconnection with a container, comprising:
    a peripheral curl;
    a chuck wall interconnected to a lower end of the peripheral curl;
    a countersink interconnected to a lower end of the chuck wall; and
    a central panel interconnected to the countersink, the central panel comprising a tear panel defined by a frangible score, a non-frangible hinge segment, and a tab for opening the tear panel;
    the tear panel comprising a sidewall, a ramp extending upwardly toward a public side of the end closure from the frangible score, and a transition between the sidewall and the ramp;
    the ramp comprising a first slope extending toward a public side of the end closure from a point proximal to the frangible score and generally toward the transition, the first slope comprising an angle with respect to a horizontal plane of between approximately 1 and 5 degrees;
    the sidewall comprising a second slope extending from a point proximal the transition toward the non-frangible hinge segment and wherein the transition comprises a point of inflection between the first slope and the second slope, the sidewall further comprising a sidewall angle between the second slope and the substantially horizontal plane, wherein the second slope comprises a different angle than the first slope.

2. The metallic end closure of claim 1, wherein the sidewall comprises a first lateral endpoint and a second lateral endpoint, the sidewall extending upward from a deboss portion of the tear panel to the transition, and wherein the ramp extends downwardly from the transition.

3. The metallic end closure of claim 1, wherein the transition extends above a substantially horizontal plane within which the tear panel resides between approximately 0.001 inches and approximately 0.020 inches.

4. The metallic end closure of claim 1, wherein the transition extends above a substantially horizontal plane within which the tear panel resides between approximately 0.011 inches and approximately 0.015 inches.

5. The metallic end closure of claim 1, wherein the transition comprises a curvilinear shape when viewed in plan view.

6. The metallic end closure of claim 1, wherein the tab comprises a nose portion, the nose portion being offset from an outer periphery of the transition and adapted to apply a force to the tear panel at between approximately 0.010 inches and approximately 0.015 inches from the outer periphery.

7. The metallic end closure of claim 1, wherein the tab comprises an arcuate nose portion and at least a portion of the transition comprises an arcuate shape that is substantially parallel to a portion of the arcuate nose portion.

8. The metallic end closure of claim 7, wherein the arcuate nose portion and the transition portion comprise concentric arcuate portions.

9. The end closure of claim 1, wherein an uppermost point of the raised portion of the tear panel extends above a non-raised portion of the tear panel from about 0.011 inches to about 0.015 inches.

10. The end closure of claim 1, wherein the non-raised portion of the tear panel is disposed within a substantially horizontal plane, and wherein the first endpoint and the second endpoint of the sidewall reside within the substantially horizontal plane.

11. A metallic end closure adapted for interconnection with a container, comprising:
    a peripheral curl;
    a chuck wall interconnected to a lower end of the peripheral curl;
    a countersink interconnected to a lower end of the chuck wall; and
    a central panel interconnected to the countersink and including a tear panel defined by a frangible score and a non-frangible hinge segment, wherein the tear panel includes a non-raised portion and a raised portion, wherein the raised portion includes a sidewall, a ramp, and a curvilinear transition between the sidewall and the ramp, wherein the sidewall has a first endpoint and a second endpoint, the first endpoint and the second endpoint being spaced apart by a predetermined distance, and the sidewall extends upward from the non-raised portion of the tear panel to the transition, the sidewall forming a sidewall angle with the non-raised portion of the tear panel, wherein the ramp extends upward from a substantially horizontal plane comprising the central panel, the ramp forming a ramp angle with the substantially horizontal plane, wherein the ramp angle is between approximately 2 and 4 degrees, and wherein the sidewall angle is a different angle than the ramp angle.

12. The end closure of claim 11, wherein the sidewall has a linear profile, wherein the ramp has a linear profile, and wherein the linear profile of the sidewall has a greater slope than the linear profile of the ramp.

13. The end closure of claim 11, wherein the transition comprises an inflection point between the ramp and the sidewall.

14. The end closure of claim 13, wherein the sidewall has a convex profile, and wherein the ramp has a concave profile.

15. The end closure of claim 11, further comprising a pull tab interconnected to the central panel and having an arcuate nose.

16. The end closure of claim 15, wherein the sidewall further comprises a first arcuate segment positioned substantially parallel to a portion of the frangible score, a third arcuate segment positioned substantially parallel to the arcuate nose of the tab, a fifth arcuate segment positioned substantially parallel to a portion of the frangible score and generally opposing the first arcuate segment, a second arcuate segment interconnecting the first arcuate segment and the third arcuate segment, and a fourth arcuate segment interconnecting the third arcuate segment and the fifth arcuate segment.

17. A method of forming a container end closure, the method comprising:
  providing a base material;
  forming a peripheral curl in base material;
  providing a chuck wall interconnected to a lower end of the peripheral curl;
  providing a countersink interconnected to a lower end of the chuck wall and a central panel interconnected to the countersink;
  forming a score line in the base material, wherein the forming of the score line displaces at least some of the base material away from the score line and forms a tear panel;
  securing the base material between a first tooling member and a second tooling member, at least one of the first and second tooling members comprising a relief portion disposed on a public side of the base material for allowing an upward deformation of a portion of the base material;
  contacting the content side of the base material with a deforming tool, the deforming tool comprising an inclined portion, wherein at least a portion of the inclined portion is in axial alignment with at least a portion of the relief portion;
  forming an upward oriented feature within the score line, wherein forming the upward oriented feature stiffens a tear panel formed by the score line and re-draws the displaced base material created during formation of the score line;
  the upward oriented feature comprising a sidewall, a ramp extending upwardly toward a public side of the end closure from the score line, and a transition between the sidewall and the ramp;
  the ramp having a first slope extending toward a public side of the end closure from a point proximal to the score line and generally toward the transition, the first slope comprising an angle with respect to a horizontal plane of between approximately 1 and 5 degrees;
  the sidewall comprising a second slope extending from a point proximal the transition toward the non-frangible hinge segment and wherein the transition comprises a point of inflection between the first slope and the second slope, the sidewall further comprising a sidewall angle between the second slope and the horizontal plane, wherein the second slope comprises a different angle than the first slope; and
  wherein the sidewall extends along an arcuate path between a first endpoint and a second endpoint, the first endpoint and the second endpoint being spaced apart by a predetermined distance.

18. The method of claim 17, further comprising forming a downward oriented step connecting the upward oriented feature to the base material.

19. The method of claim 17, further comprising forming a deboss area within the base material.

20. The method of claim 17, further comprising forming a peripheral curl at an outer circumference of the base material, the peripheral curl adapted for interconnection to a container body.

* * * * *